United States Patent [19]

Dauvergne

[11] 4,326,379
[45] Apr. 27, 1982

[54] HYDRAULIC CONTROL DEVICE FOR A MOTOR VEHICLE BRAKING CIRCUIT

[75] Inventor: Jean L. R. Dauvergne, Fosses, France

[73] Assignee: Societe Anonyme Francaise du Ferodo, Paris, France

[21] Appl. No.: 92,420

[22] Filed: Nov. 6, 1979

[51] Int. Cl.³ .............................................. B60T 13/20
[52] U.S. Cl. ......................................... 60/550; 60/551; 60/554; 91/391 A
[58] Field of Search ................... 60/547 R, 548, 550, 60/551, 552, 553, 554, 582; 91/391 A, 391 R, 384

[56] References Cited

U.S. PATENT DOCUMENTS

| | | | |
|---|---|---|---|
| 3,059,434 | 10/1962 | Farmery | 60/551 |
| 3,250,183 | 5/1966 | Gephart | 91/391 A |
| 3,327,479 | 6/1967 | Harness | 91/391 A |
| 3,625,005 | 12/1971 | Saunders | 60/550 |
| 3,664,130 | 5/1972 | Meyers | 60/550 |
| 3,855,905 | 12/1974 | Carre | 91/391 R |
| 4,078,385 | 3/1978 | Zabadneh | 60/550 |
| 4,206,605 | 6/1980 | Mehren | 60/582 |

FOREIGN PATENT DOCUMENTS 2329907 12/1973 Fed. Rep. of Germany .... 60/547 R

*Primary Examiner*—Abraham Hershkovitz
*Attorney, Agent, or Firm*—Young & Thompson

[57] ABSTRACT

The invention relates to a master cylinder for an automobile braking circuit which is suitable for dual-circuit or single-circuit application.

The master cylinder has at least one chamber connected to the braking circuit, the pressure in the chamber being controlled by depression of a master piston by a brake pedal. An auxiliary hydraulic circuit is connected to the master cylinder and this circuit has a source of pressure and a jack, a piston of which co-operates with the master piston to cause depression thereof; a distributor is provided suitable for feeding the jack with auxiliary hydraulic pressure from the source, the distributor having a slide valve which is subjected to two opposing forces, one of which is developed by the auxiliary hydraulic pressure and the other of which is developed by the action of the pedal via means for transmitting this force between the pedal and the slide valve, with the intervention of elastic means for simulating the pedal movement, and manual backup means acting on the master piston, from the pedal, in the event of failure of the auxiliary circuit. A movable member in the master cylinder which is controlled by the auxiliary hydraulic pressure at the same time as the slide valve of the said distributor, is associated with the elastic means for simulating the pedal movement, so as to put these means out of action in response to a failure of the auxiliary hydraulic pressure. According to the invention, the manual back-up means, the movable member, and the slide valve of the distributor act respectively along three separate and parallel axes.

16 Claims, 8 Drawing Figures

HYDRAULIC CONTROL DEVICE FOR A MOTOR VEHICLE BRAKING CIRCUIT

BACKGROUND OF THE INVENTION

The present invention relates to a hydraulic control device suitable for a motor vehicle hydraulic braking circuit; more particularly the invention relates to a hydraulic control device comprising a master cylinder, at least one chamber of which is connected to the said braking circuit and which has its pressure controlled by the depression of a master piston under the action of a pedal, an auxiliary hydraulic circuit having a source of pressure, a jack, a piston of which cooperates with the said master piston to cause the depression of the latter, a distributor suitable for feeding the jack with auxiliary hydraulic pressure from the said source, the said distributor having a slide valve which is subjected to two opposing forces, one of which is developed by the auxiliary hydraulic pressure and the other of which is developed by the action of the pedal via means for transmitting force between this pedal and this slide valve, with the intervention of elastic means for simulating the pedal movement, and manual back-up means acting on the master piston, from the pedal, in the event of failure of the auxiliary circuit.

The master cylinder of the present invention is particularly suitable for an arrangement in which two independent braking circuits are provided, the master cylinder having two chambers which are isolated from one another and are respectively connected to the said braking circuits, and the pressure in each of these chambers being controlled by the depression of the master piston.

In hydraulic controls of this kind, the displacement stroke of the slide valve of the distributor, for increasing or reducing the intervention capacity of the auxiliary braking circuit in accordance with the pressure applied to the brake pedal by the driver is very small, for example of the order of a millimetre. It is for this reason that the elastic means for simulating the pedal movement are provided. In this manner, the driver has available a foot movement which is not reduced to such a small value, but which has an adequate value for driving comfort and safety, that is to say of the order of about ten centimetres, and gives the driver a feeling of total control over braking.

The hydraulic controls of this kind thus possess a sensitivity of response of the auxiliary braking circuit to the desire shown by the driver by means of the pedal, which results from the instantaneous value of the force exerted on the pedal rather than from the amplitude of depression of the pedal. The effect thus obtained is generally termed "force feed-back" and exhibits, inter alia, the advantage that it avoids a worrying blank movement of the pedal in the event of a break in one of the hydraulic braking circuits. This results in considerably enhanced driving safety.

However, the hydraulic controls of the above-mentioned type exhibit the disadvantage that, in the event of failure of the auxiliary hydraulic circuit, the driver must physically overcome not only the resistance offered by the braking circuits but also the resistance offered by the deformation of the elastic means for simulating the pedal movement. The effectiveness of the manual back-up in the event of failure of the auxiliary braking circuit is then reduced and even runs the risk of being jeopardised.

The present invention relates to a hydraulic control device in particular for a motor vehicle braking circuit, which control device is of the type described above but which does not exhibit this disadvantage, which is of simple and convenient construction and which makes it possible, if necessary, to use components of a common type, in its construction, such as conventional master-cylinder elements, a customary type of distributor, and the like.

SUMMARY

According to the invention, a hydraulic control device for a motor vehicle braking circuit, which control device is of the kind described above, is characterised in that a movable member, which is separate from the distributor and controlled by the auxiliary hydraulic pressure at the same time as the slide valve of the distributor, is associated with the elastic means for simulating the pedal movement, so as to put these means out of action in response to a failure of the auxiliary hydraulic pressure.

By virtue of this arrangement, the control device makes it possible to benefit from the advantage of the "forced feed-back", in particular and inter alia the advantage that a worrying blank movement of the pedal in the event of a break in a braking circuit is avoided, and also from the advantage of a manual back-up force in the event of failure of the auxiliary braking circuit, which force has been relieved of the resistance offered by the elastic means for simulating the pedal movement. Moreover, a distributor of a common type can be used.

According to a further characteristic of the invention, the above-mentioned means for transmitting force cooperate with the said movable member so as to be rendered inoperative when the said member is allowed to move in response to a failure of the auxiliary hydraulic pressure.

In one embodiment of the invention, these means for transmitting force consist of lever means having two points of application of force, which cooperate respectively with the pedal and with the slide valve, and a third point of application of force, which cooperates with the movable member, whilst, as a variant, the said means for transmitting force comprise hydraulic connecting means between the pedal and the slide valve and means for bringing these hydraulic connecting means into communication with a reservoir, the said means for bringing the hydraulic connecting means into communication with the reservoir cooperating with the said movable member so as to be rendered active when the said movable member is allowed to move in response to a failure of the auxiliary hydraulic pressure.

DESCRIPTION OF THE PREFERRED EMBODIMENTS

Reference will first be made to FIGS. 1 to 5 which relate, by way of a non-limiting example, to the application of a hydraulic control device according to the invention to a motor vehicle braking arrangement having two independent braking circuits.

Figure 1:
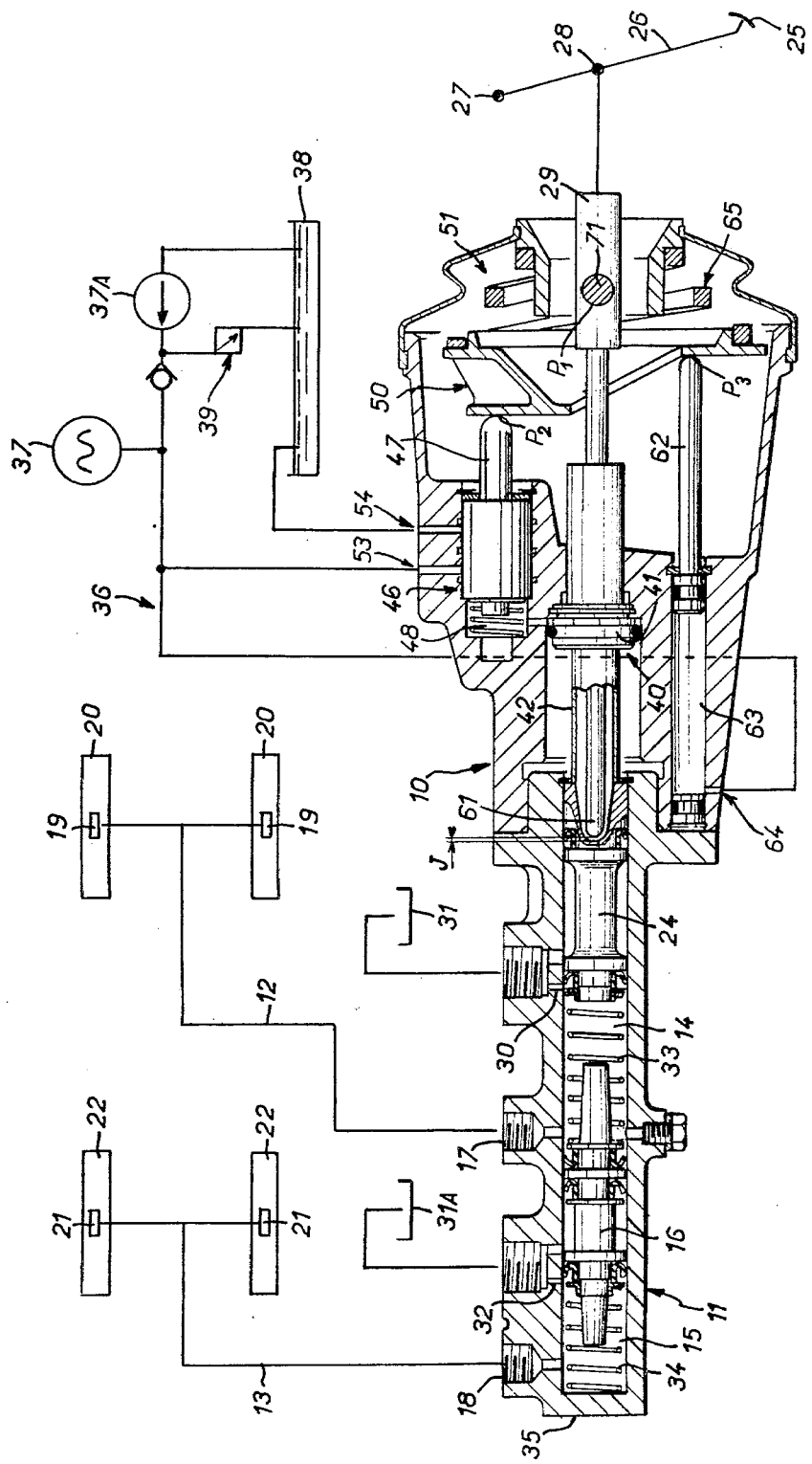
FIG. 1 is a view in longitudinal section of a hydraulic control device according to the invention, for a motor vehicle braking circuit which control device comprises a master cylinder.

FIG. 1 shows the hydraulic control device 10 comprising a master cylinder 11, and the two independent braking circuits 12 and 13.

The master cylinder 11 is of the tandem type and has two chambers 14 and 15 which are isolated from one another by a plunger 16 mounted so as to slide in the master cylinder 11. The chambers 14 and 15 are respectively connected to the two braking circuits 12 and 13 by means of orifices 17 and 18.

In the non-limiting example shown in FIG. 1, the circuit 12 feeds the wheel-braking cylinders 19 of the rear wheels 20, whilst the circuit 13 feeds the wheel-braking cylinders 21 of the front wheels 22.

The pressure in the chambers 14 and 15 is controlled by the depression of a master piston 24 which is mounted so as to slide in the master cylinder 11 under the effect of the action of a brake pedal 25. The latter is firmly mounted at the end of a pedal lever 26 which is itself mounted so as to pivot at 27 and is articulated at 28 on a sprag 29. The latter is intended to cause the depression of the master piston 24 under the direct action of the pedal 25, by way of manual back-up in the event of failure of an auxiliary hydraulic circuit 36 which will be described in detail below.

The master piston 24, which is mounted so as to slide in the master cylinder 11, cooperates with an orifice 30 connected to a reservoir 31, and this makes it possible to ensure that the chamber 14 and the circuit 12 are kept full. This orifice 30 is blocked by the passage of the master piston 24 as soon as the depression of the latter starts for the purpose of braking. The plunger 16 cooperates in an analogous manner with an orifice 32 which is connected to a reservoir 31A, and this makes it possible to ensure that the chamber 15 and the circuit 13 are kept full. The orifice 32 is blocked by the passage of the plunger 16 as soon as the depression of the latter starts when braking takes place.

33 and 34 show return springs located respectively between the master piston 24 and the plunger 16 and between the plunger 16 and the base 35 of the master cylinder 11. An auxiliary hydraulic circuit, designated in general by 36, is intended to assist the force on the pedal 25 in normal operation.

This auxiliary hydraulic circuit 36 (FIG. 2) comprises a source of pressure, for example in the form of a hydraulic accumulator 37 with a pump 37A which draws from a reservoir 38 and is provided with a discharge valve 39.

The hydraulic auxiliary circuit also comprises (FIG. 2) a jack 40, of which a piston 41 cooperates with the master piston 24 in order to cause the depression of the latter in normal operation. More particularly, the piston 41 is integral with a tubular spacer 42 which surrounds the sprag 29 and which is suitable for exerting a thrust, at 43, on the master piston 24. 45 shows the chamber of the jack 40, which chamber is suitable for being fed by the auxiliary hydraulic pressure of the circuit 36.

A hydraulic distributor, designated in general by 46 (FIGS. 2, 4 and 5), is suitable for feeding the chamber 45 of the jack 40 with auxiliary hydraulic pressure from the source of hydraulic pressure 37–37A.

The distributor 46 has a slide valve 47 which is subjected to two antagonistic forces. One of these forces is developed by the auxiliary hydraulic pressure in a chamber 48 of the distributor 46 and is exerted on one end 49 of the slide valve 47. The other antagonistic force is developed by the action of the pedal 25 via means for transmitting force between the pedal 25 and the slide valve 47, with the intervention of elastic means for simulating the pedal movement. These means for transmitting force are designated in general by 50, whilst the elastic means for simulating the pedal movement are designated in general by 51.

More particularly (FIGS. 1 and 4), the distributor 46 has a body 52 possessing two orifices 53 and 54. The orifice 53 is connected to the source of pressure 37–37A, whilst the orifice 54 is connected to the reservoir 38 by means of a pipe 56.

Figure 4:
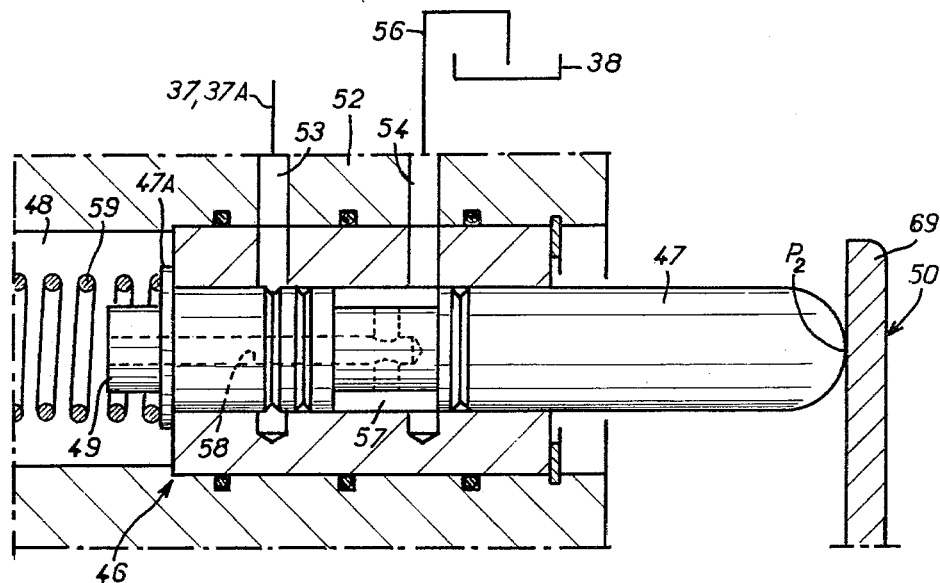
FIG. 4 is a view, on an even larger scale, of the distributor with its slide valve in the rest position.

The slide valve 47 of the distributor 46 comprises a central annular groove 57 which is suitable for communicating either with the orifice 53 (FIG. 5) or with the orifice 54 (FIG. 4), depending on the position of the slide valve 47. The annular groove 57 is in permanent communication with the chamber 48 by any appropriate means, for example by means of a channel 58 provided in the slide valve 47. A spring 59 of low stiffness is intended to return the slide valve 47 into a rest position, defined by the stop 47A, against the body 52 (FIG. 4).

In the example shown in FIGS. 1 to 5, the chamber 45 of the jack 40 is fed with auxiliary hydraulic pressure by means of a pipe 60 which connects the chamber 45 to the chamber 48 of the distributor 46.

Manual back-up means comprising the sprag 29 are intended to act directly on the master piston 24, from the pedal 25, in the event of failure of the auxiliary circuit 36.

Figure 2:
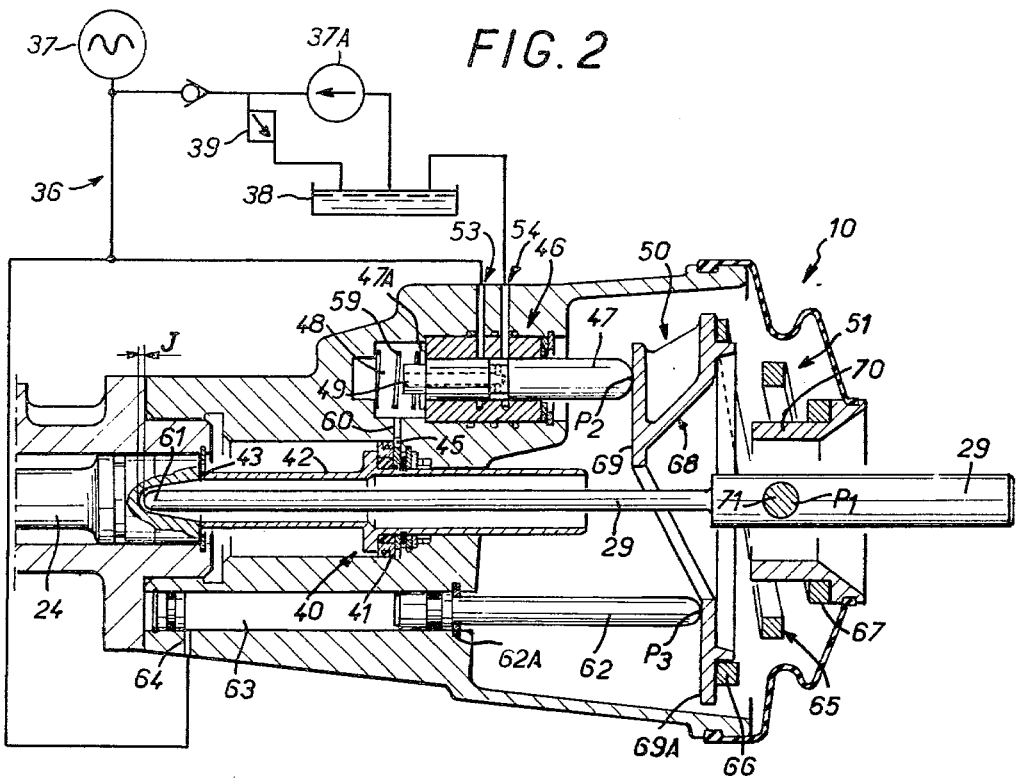
FIG. 2 is a view, on a larger scale, of part of this hydraulic control device in the normal rest position.

For this purpose, the sprag 29 extends inside the spacer 42 and possesses an end 61 which, in the position in FIG. 2, is separated from the master piston 24 by a small clearance J. The latter is immediately taken up in the event of failure of the auxiliary hydraulic circuit and it is then the direct action of the sprag 29 on the master piston 24 (FIG. 3) which causes the braking for backing up the absence of thrust of the spacer 42 on this master piston.

A movable member 62 is provided which is controlled by the auxiliary hydraulic pressure at the same time as the slide valve 47 of the distributor 46. This movable member 62 is separate from the slide valve 47.

In the non-limiting example shown in FIG. 2, the axes of the member 62 and of the slide valve 47 are parallel to the axis of the master piston 24 and of the sprag 29 and are located on either side of the said axis. This movable member 62 is associated with elastic means 51 for simulating the pedal movement, so as to put these means out of action in response to a failure of the auxiliary hydraulic pressure.

Figure 3:
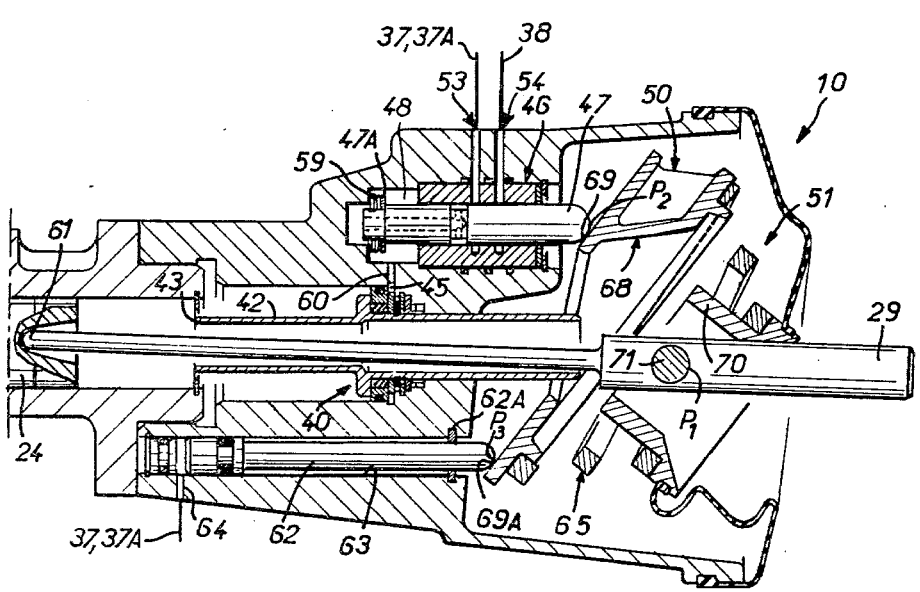
FIG. 3 is an analogous view to FIG. 2 but shows this part of the hydraulic control device in another position in which a manual back-up intervenes in the event of failure of the auxiliary braking circuit.

More particularly, the movable member 62 consists of a finger which is mounted so as to move between an advanced active position defined by a stop 62A (FIG. 2) and a retracted inactive position (FIG. 3). The finger 62 forms a piston associated with a chamber 63 which is connected to the auxiliary hydraulic circuit 36, for example by means of an orifice 64 connected directly to the circuit 36, as shown in FIG. 2 or also by means of a channel (not shown) for connection to the chamber 45.

The means 50 for transmitting force cooperate with the movable member 62 (FIG. 2) so as to be rendered inoperative when the finger 62 is allowed to retract (FIG. 3) in response to a failure of the auxiliary hydraulic pressure.

In the example of FIGS. 1 to 5, the means 50 for transmitting force consist of lever means, of which two points P1 and P2 for the application of force cooperate respectively with the pedal 25 and with the slide valve 47. These lever means have a third point P3 for the application of force, which cooperates with the finger 62.

In the non-limiting example of FIGS. 1 to 5, the lever means 50 incorporate elastic means 51 for simulating the pedal movement.

More particularly, the assembly 50, 51 comprises, in FIGS. 1 to 3, a helical spring 65 having the general shape of a truncated cone, of which the end turn corresponding to the large base is shown by 66 and the end turn corresponding to the small base is shown by 67. The turn 66 is mounted on a plate 68 having a bearing 69, which cooperates with the slide valve 47 in the stop position at P2, and a bearing 69A, which cooperates with the finger 62 in the stop position at P3. The turn 67 is mounted on a sleeve 70 which is mounted so as to pivot on the sprag 29 by means of an articulation 71 constituting the point P1.

The system operates as follows:

Provided that the pedal 25 is not being pressed, the device occupies the position shown in FIG. 2 and in FIG. 4. The spring 65 is in the unstressed rest position and the sprag 29, connected to the socket 70 via the articulation 71, occupies an extreme rest position towards the right-hand side of FIG. 2. The pressure applied by the source of pressure 37-37A to the chamber 63 keeps the finger 62 in the advanced position defined by the stop 62A, whilst the slide valve 47 is kept in the advanced position defined by the stop 47A by means of the spring 59, the chamber 48 being brought into communication with the reservoir 38 (FIGS. 2 and 4). In this rest position, the end 61 of the sprag 29 is very slightly separated from the master piston 24 by the small clearance J.

Figure 5:
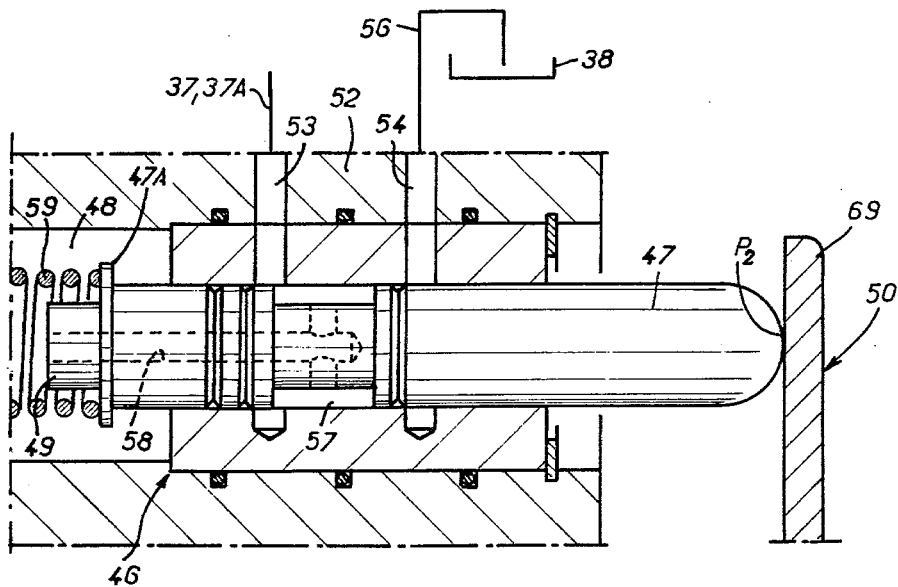
FIG. 5 is an analogous view to FIG. 4 but shows the slide valve of the distributor in the working position during braking.

When the pedal 25 is depressed, the plate 68 bears on the finger 62, and the spring 65, acting on the plate 68, pushes the slide valve 47 back towards the left-hand side of FIGS. 2 and 4, which has the effect of causing this slide valve 47 to move from the position in FIG. 4 to the position in FIG. 5.

Thus, instead of being in communication with the reservoir 38, via 58, 57, 54 and 56, the chamber 48 has been brought into communication with the source of pressure 37-37A via 58, 57 and 53. The pressure starts to exert itself in this chamber 48 and simultaneously acts on the piston 41 of the jack 40 through the chamber 45, which has the effect of starting to displace the master piston 24 slightly, and then, after blocking the orifice 30, to displace the plunger 16 by means of the oil column in chamber 14. The two braking circuits 12 and 13 are thus placed under pressure.

By acting on the end face 49 of the slide valve 47, the pressure building up in the chamber 48 has the effect of tending to push the slide valve 47 back towards the right-hand side of FIG. 5 and to block the pressure feed orifice 53.

However, the driver's desire to brake, which is shown by continued depression of the pedal 25, has the effect of further compressing the spring 65 and of pushing the slide valve 47 towards the left-hand side of FIG. 5, increasing the opening of the pressure feed orifice 53. The chamber 48 is therefore always fed by the source of fluid pressure 37-37A and the same applies to the chamber 45 of the jack 40, the piston 41 of which continues to exert its action on the master piston 24.

This is the situation provided that the user shows his desire to increase braking by continuing his action on the pedal 25.

It must be noted that the desire of the driver to brake more or less strongly is therefore respected by the infinitesimal displacements of the slide valve 47, which uncover the orifice 53 to a greater or lesser extent by means of the force feed-back effect.

When the driver ceases to exert his thrust on the pedal 25, the slide valve 47 moves from the position in FIG. 5 to that in FIG. 4, which releases the pressure in the chamber 45 of the jack 40 and therefore causes the thrust on the master piston 24 to cease.

In the event of failure of one of the two braking circuits 12 and 13, for example as a result of a break in the circuit, braking continues to be ensured by the circuit which has remained undamaged.

For example, if the circuit 13 is defective when the pedal 25 is actuated, the pressure in the chamber 14 has the effect of displacing the plunger 16 towards the left-hand side until it stops (FIG. 1) against the base 35 of the master cylinder 11. The pressure is allowed to rise in the chamber 14 and this has the effect of feeding the circuit 12 which has remained undamaged. Thus, braking continues to be ensured by means of the rear brakes 19.

If it is the circuit 12 which is defective, the master piston 24 moves until it comes to rest against the plunger 16, and the assembly 24, 16 is integrally displaced, causing the pressure in the chamber 15 to rise, and this feeds the circuit 13 which has remained undamaged and ensures braking by means of the front brakes 21.

It must be noted that, in the event of a break in the circuit 12 or in the circuit 13, no worrying loss of movement in the pedal 25 is observed by virtue of the fact that the blank stroke of the master piston associated with the defective circuit is entirely borne by the jack 40. Driving safety is thus preserved under excellent conditions.

In the event of failure of the auxiliary circuit 36, the pressure drops in the chambers 48, 45 and 63. The action on the pedal 25 has the effect of displacing the slide valve 47 in the chamber 48, as shown in FIG. 3, until it is stopped through compression of the spring 59. The sprag 29, pushed directly by the pedal 25, displaces the master piston 24 by means of the end 61 of this sprag 29 after the minimum clearance J has been taken up. It is to be noted that the spring 65 does not offer any resistance to this movement since the finger 62 is pushed back, without any resistance, by the plate 68 towards the lefthand side of FIG. 3 because the chamber 63 is no longer under pressure.

Thus, the manual back-up maneuver on the pedal 25 does not have to overcome the resistance of the spring 65, which makes this manuever less difficult and consequently more effective.

Moreover, immediate advantage is taken of the return of the auxiliary hydraulic circuit as soon as the latter ceases to be defective.

Figure 6:
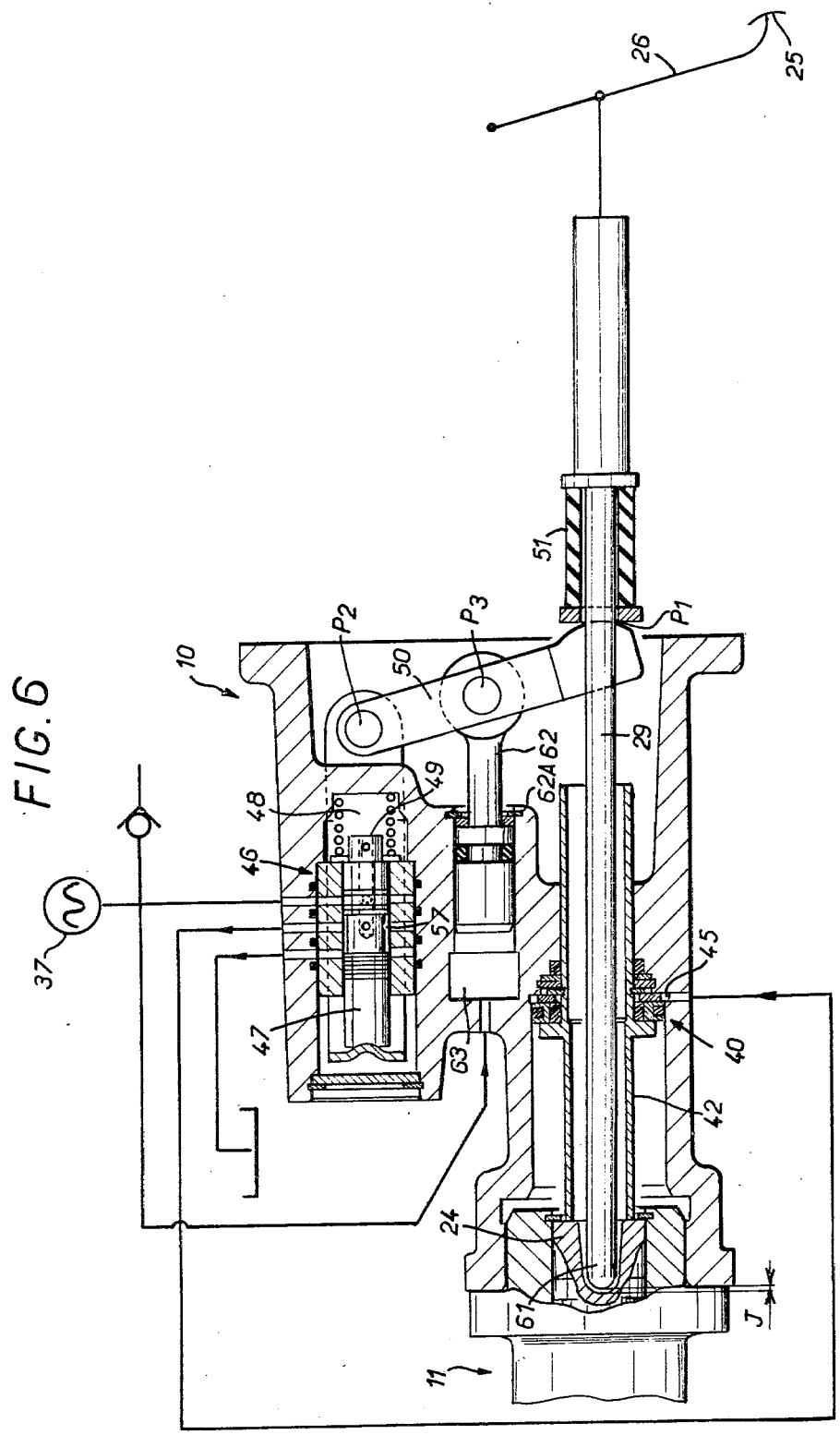
FIGS. 6, 7 and 8 are analogous views to FIG. 2 but relate to three variants respectively.

Reference will now be made to FIG. 6 in which the arrangement is analogous to that which has just been described with reference to FIGS. 1 to 5, and in which the means 50 for transmitting force still consist of lever means with a point P1 for the application of force, which cooperates with the pedal 25, a point P2 for the application of force, which cooperates with the slide valve 47, and a point P3 for the application of force, which cooperates with the finger 62. However, in FIG. 6, the lever means 50 do not incorporate the elastic means 51 for simulating the pedal movement. In FIG. 6, these elastic means 51 for simulating the pedal movement are associated with the lever means 50 at one or more of their points P1, P2 and P3 for the application of force, this being the point P1 in the case of the example of FIG. 6, by being located between the lever means 50 and the pedal 25. More particularly, these elastic means 51 for simulating force consist of a sleeve made of elastic material.

The system operates analogously to that described above.

In the embodiment of FIGS. 1 to 5, as in that of FIG. 6, the lever means 50 are separate from the lever 26 integral with the pedal 25.

Figure 7:
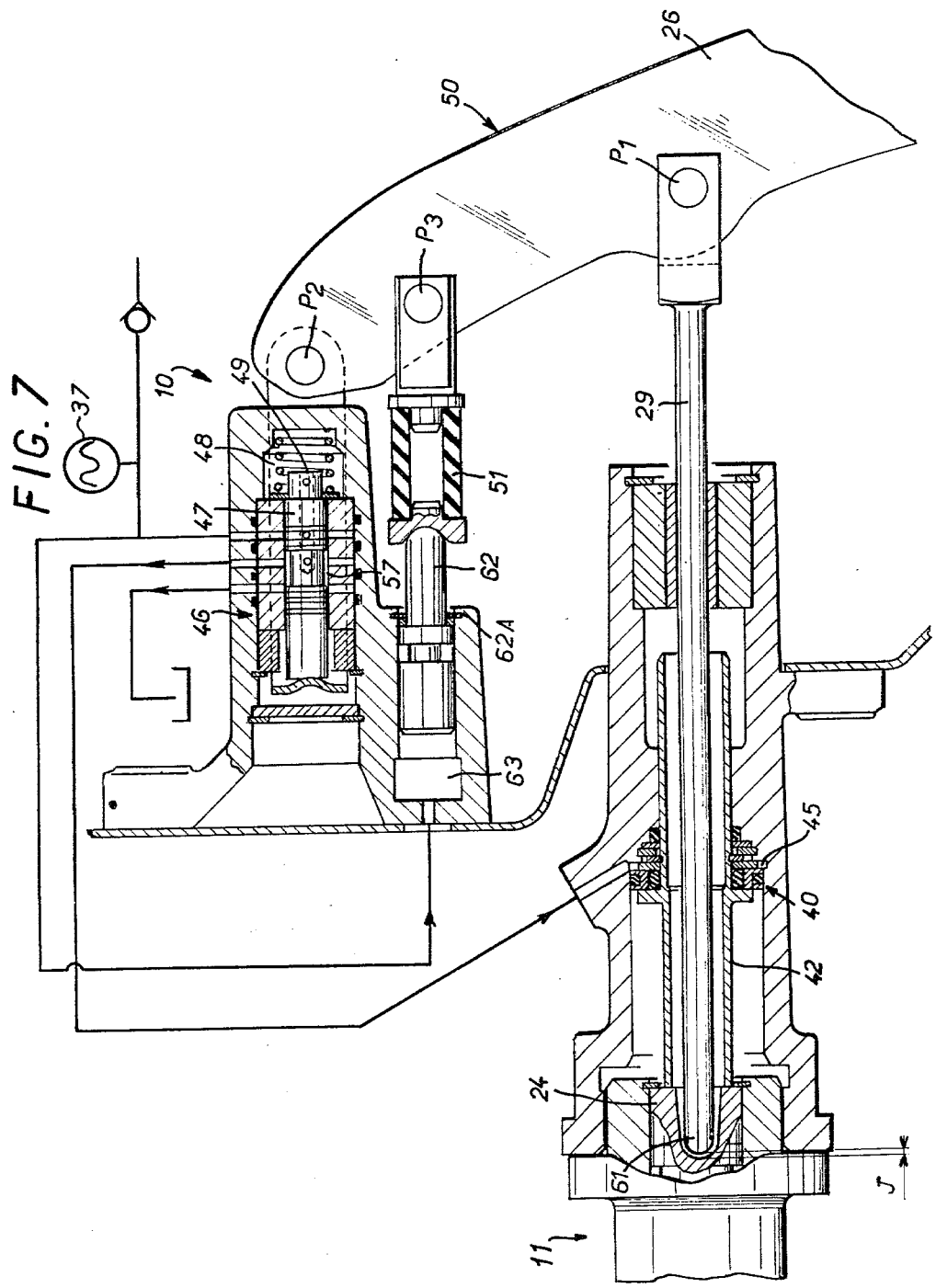

Reference will now be made to FIG. 7 in which, as a variant, the lever means 50 are directly formed by the lever 26 integral with the pedal 25.

In FIG. 7, the arrangement is analogous to that described with reference to FIG. 6, but in this case the elastic means 51 for simulating the pedal movement, which are formed, for example, by a sleeve made of elastic material, are located between the lever 26 and the finger 62 at the point P3 for the application of force. P1, P2 and P3 show the points for the application of force, on the lever 26, which cooperate respectively with the pedal 25, with the slide valve 47 and with the movable member 62.

It will be appreciated that, in FIG. 6, the elastic means 51 for simulating the pedal movement are associated with the point P1 and that, in FIG. 7, they are associated with the point P3. Of course, they could also be associated with the point P2.

In the embodiments described respectively with reference to FIGS. 1 to 5, with reference to FIG. 6 and with reference to FIG. 7, the means 50 for transmitting force are formed by lever means which are either separate from the pedal lever 26 or are formed by the latter.

In another variant (FIG. 8), the means for transmitting force comprise hydraulic connecting means 80 between the pedal 25 and the slide valve 47, and also means 81 for bringing these hydraulic connecting means 80 into communication with a reservoir 82. The reservoir 82 can be formed by the reservoir 38.

The means 81 for bringing the hydraulic connecting means into communication with the reservoir 82 cooperate with the movable finger 62 so as to be rendered inactive when the finger 62 is allowed to retract in response to a failure of the auxiliary hydraulic pressure.

The elastic means 51 for simulating the pedal movement consist of an accumulator, for example a spring accumulator 51, which is exposed at 83 to the pressure of the hydraulic connecting means 80.

Figure 8:
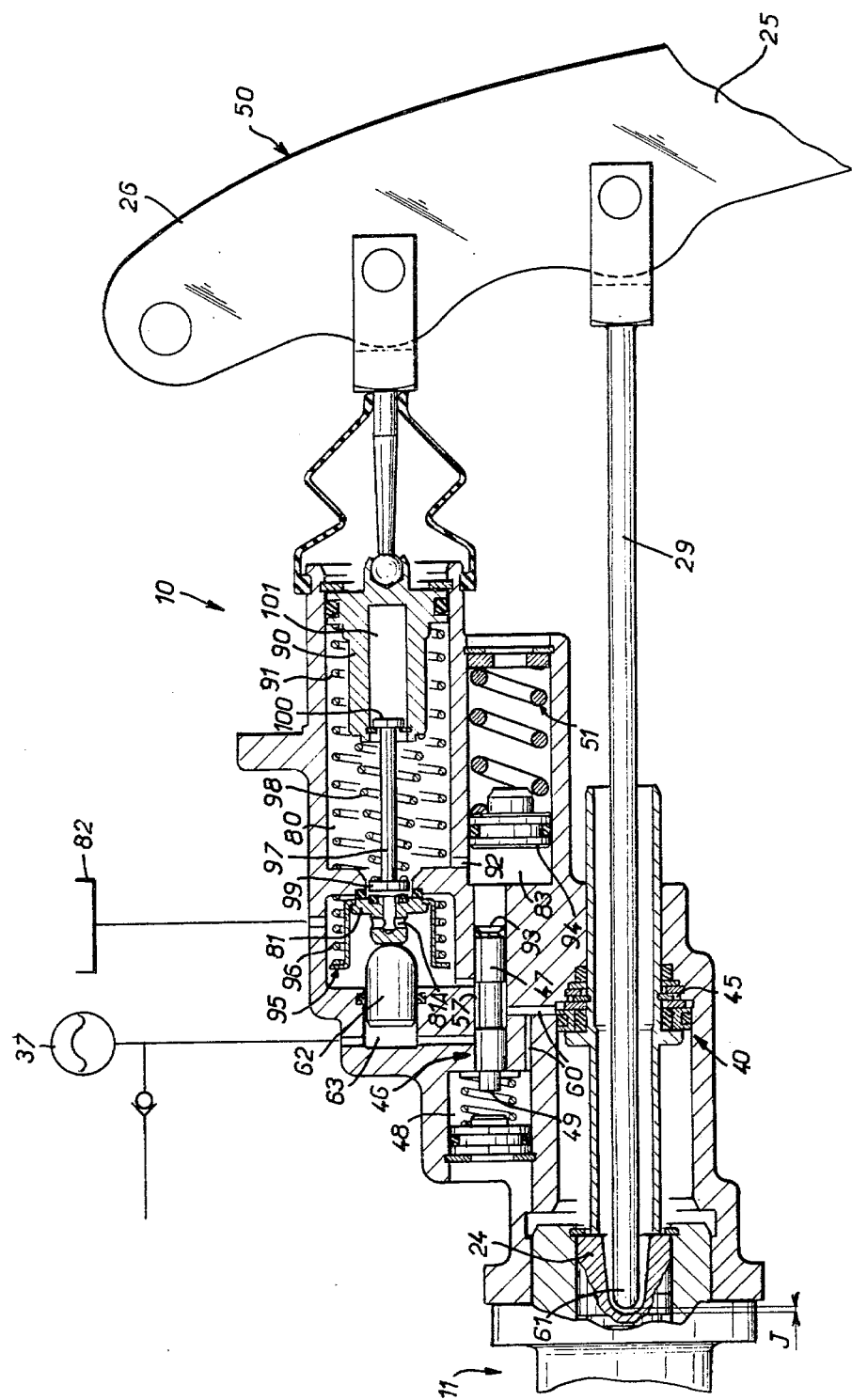

FIG. 8 shows the pedal lever 26 and the sprag 29, which sprag is suitable for cooperating with the master piston 24 in the event of failure of the auxiliary hydraulic circuit. As above, the sprag 29 is surrounded by the jack 40, the thrust chamber 45 of which is connected to the chamber 48 of the distributor 46 by means of the pipe 60. 47 shows the slide valve of this distributor 46 and 57 shows its annular groove which is in permanent communication with the thrust chamber 48 and with the chamber 45 of the jack 40, and which is suitable for being brought into communication, depending on the position of the slide valve 47, either with the source of auxiliary pressure 37–37A or with the orifice for connection with the reservoir 82.

The pedal lever 26 acts on the slide valve 47 by means of the hydraulic pressure at 80. This pressure is generated by a piston 90 which is joined to the lever 26.

The piston 90 is returned to the rest position by a spring 91 of low stiffness. The chamber 80 communicates with the chamber 83 by means of an orifice 92. The opposite ends 93 and 49 of the slide valve 47 are respectively exposed to the antagonistic pressures of the chamber 83 and of the chamber 48. The chamber 83 is defined by an accumulator piston 94 cooperating with the spring 51 for simulating the pedal movement. The chamber 80 is normally closed by the means 81 for bringing it into communication with the reservoir 82, which means are formed by a valve in this case. This valve 81 is kept closed by the movable finger 62 which is subjected to the auxiliary pressure of the circuit 36.

95 shows a cup which is associated with the valve 81 and cooperates with a spring 96 of low stiffness, which is intended to push the valve 81 back into the open position when the finger 62 is allowed to retract if the pressure in the chamber 63 drops, which has the effect of bringing the chamber 80 and 83 into communication with the reservoir 82. A rod 97 cooperates with the piston 90 and is returned by a spring 98 of low stiffness. The end 99 of the rod 97 is suitable for opening an orifice 81A in the valve 81 in order to bring the chamber 80 into communication with the reservoir in the rest position.

The system operates analogously to that described above.

When the auxiliary circuit 36 is undamaged, the finger 62 is advanced and this has the effect of closing the valve 81. Action on the pedal lever 26 has the effect of initially covering the orifice 81A and then causing the piston 90 to advance against the action of the spring 51 for simulating the pedal movement, whilst the end 100 of the rod 97, which is opposite the rod 99, is suitable for penetrating into a cavity 101 in the piston 90.

The pressure in the chamber 80 and also in the chamber 83 rises and tends to push the accumulator piston 94 back towards the right-hand side of FIG. 8 against the action of the spring 51 for simulating the pedal movement.

In the event of failure of the auxiliary hydraulic circuit, the pressure in the chamber 63 drops and the finger 62 retracts, which has the effect of allowing the valve 81 to open and of bringing the chambers 80 and 83 into communication with the reservoir 82, thus causing the elastic resistance offered by the spring 51 to cease when the pedal 25 is depressed.

By means of direct back-up action on the sprag 29, the action of this pedal 25 has the effect of pushing the master piston 24 for braking, without it being necessary for the user to overcome the elastic resistance of the spring 51.

I claim:

1. A hydraulic control device for a motor vehicle brake system having at least one hydraulic brake circuit, said control device comprising a master cylinder having at least one chamber connected to said brake circuit and a master piston for controlling the pressure in said one chamber under the action of a pedal, an auxiliary hydraulic circuit having a source of pressure, a hydraulic cylinder and piston unit including a piston for cooperating with said master piston for depressing the latter, distributor means for feeding auxiliary hydraulic pressure from said source to said cylinder and piston unit, said distributor means having a slide valve which is subjected to two opposing forces, one of the opposing forces being developed by the auxiliary hydraulic pressure and the other opposing force being developed by the action of the pedal through force transmitting means between said pedal and said slide valve including elastic means that are stressed by braking movement of the pedal for simulating pedal movement, and manual back-up means operable in response to said pedal for controlling said master cylinder in the event of a failure of said auxiliary circuit, said control device having a movable member restrained against movement by said auxiliary hydraulic pressure and associated with said force transmitting means to cause said force transmitting means to stress said elastic means, said movable member being freed for movement in response to a failure of the auxiliary hydraulic pressure to relieve the stress in said elastic means, said manual back-up means, said movable member and said slide valve acting respectively along three separate and parallel axes.

2. A hydraulic control device for a motor vehicle brake system having two hydraulic brake circuits, said control device comprising a master cylinder having two chambers isolated from each other and connected to said brake circuit and a master piston for controlling the pressures in said chambers under the action of a pedal, an auxiliary hydraulic circuit having a source of pressure, a hydraulic cylinder and piston unit including a piston for cooperating with said master piston for depressing the latter, distributor means for feeding auxiliary hydraulic pressure from said source to said cylinder and piston unit, said distributor means having a slide valve which is subjected to two opposing forces, one of the opposing forces being developed by the auxiliary hydraulic pressure and the other opposing force being developed by the action of the pedal through force transmitting means between said pedal and said slide valve including elastic means for simulating pedal movement, and manual back-up means operable in response to said pedal for controlling said master cylinder in the event of a failure of said auxiliary circuit, said control device having a movable member controlled by said auxiliary hydraulic pressure at the same time as said slide valve and associated with said force transmitting means to cause said force transmitting means to stress said elastic means, said movable member being freed for movement in response to a failure of the auxiliary hydraulic pressure to relieve the stress in said elastic means, said manual back-up means, said movable member and said slide valve acting respectively along three separate and parallel axes.

3. A hydraulic control device according to claim 1 or claim 2, wherein said movable member is a finger which is mounted for movement between an advanced, active position and a retracted, inactive position, said finger forming a piston which is associated with a chamber connected to said auxiliary hydraulic circuit.

4. A hydraulic control device according to claim 3, wherein said force transmitting means cooperate with said movable member so as to be rendered inoperative when said movable member is allowed to move in response to a failure of the auxiliary hydraulic pressure.

5. A hydraulic control device according to claim 4, wherein said force transmitting means include lever means of which two points of application of force are operatively connected respectively to said pedal and said slide valve, and a third point of application of force on said lever means operatively connected to said movable member.

6. A hydraulic control device according to claim 5, wherein said lever means incorporate said elastic means for simulating the pedal movement.

7. A hydraulic control device according to claim 5, wherein said elastic means for simulating the pedal movement are separate from said lever means and act at least at one of the three points of application of force on said lever means.

8. A hydraulic control device according to claim 7, wherein said elastic means for simulating the pedal movement are located between said pedal and said lever means.

9. A hydraulic control device according to claim 7, wherein said elastic means for simulating the pedal movement are located between said lever means and said movable member 10. A hydraulic control device according to claim 5, wherein said lever means are separate from a lever integral with said pedal.

11. A hydraulic control device according to claim 5, wherein said lever means are formed by a lever integral with the pedal.

12. A hydraulic control device according to claim 3, wherein said force transmitting means comprise hydraulic connecting means between said pedal and said slide valve and means for bringing said hydraulic connecting means into communication with a reservoir, said means for bringing the hydraulic connecting means into communication with the reservoir cooperating with said movable member so as to be rendered active when said movable member is allowed to move in response to a failure of the auxiliary hydraulic pressure.

13. A hydraulic control device according to claim 12, wherein said means for bringing the hydraulic connecting means into communication with the reservoir comprise a valve which is kept closed by means of the movable member.

14. A hydraulic control device according to claim 13, wherein said last mentioned valve has an orifice which is only open in a rest position and is closed in response to depression of said pedal.

15. A hydraulic control device according to claim 12, wherein said elastic means for simulating the pedal movement comprises an accumulator under the pressure in said hydraulic connecting means.

16. A hydraulic control device according to claim 15, wherein said accumulator comprises a spring accumulator.

* * * * *